United States Patent [19]

Vassallo

[11] Patent Number: 5,445,022

[45] Date of Patent: Aug. 29, 1995

[54] MEASURING SCOOP

[75] Inventor: John A. Vassallo, Lititz, Pa.

[73] Assignee: Kerr Group, Inc., Lancaster, Pa.

[21] Appl. No.: 248,046

[22] Filed: May 24, 1994

[51] Int. Cl.$^6$ .................... G01F 19/00; E05D 1/02
[52] U.S. Cl. ................................ 73/426; 16/225
[58] Field of Search ............ D10/46.2; 16/115, 225, 16/227, 337, DIG. 13; 30/324, 327, 328; 73/426, 427; 215/DIG. 5

[56] References Cited

U.S. PATENT DOCUMENTS

| D. 127,543 | 5/1941 | Strand, Jr. ............... D10/46.2 |
| D. 269,241 | 6/1983 | Kelson .................... D10/46.2 |
| 2,807,168 | 9/1957 | Wipf ........................... 73/427 |
| 2,921,707 | 1/1960 | Sloan ........................ 73/427 X |
| 3,931,741 | 1/1976 | Ceccarelli ................... 73/427 |
| 4,403,712 | 9/1983 | Wiesinger ................ 16/DIG. 13 |
| 4,457,458 | 7/1984 | Heinol .................... 16/227 X |
| 4,616,867 | 10/1986 | O'Hara ........................ 294/55 |
| 4,788,862 | 12/1988 | Fuller ........................... 73/426 |
| 5,347,865 | 9/1994 | Mulry et al. ................... 73/427 |

FOREIGN PATENT DOCUMENTS 628436 11/1961 Italy ........................... 30/324

Primary Examiner—William A. Cuchlinski, Jr.
Assistant Examiner—Willie Morris Worth
Attorney, Agent, or Firm—Keynon & Kenyon

[57] ABSTRACT

A device for measuring a powdered or granular product includes a product receptacle having an open end, a side wall surrounding the open end and a sealing member disposed opposite the open end and coupled to the side wall. The side wall is coupled to the sealing member so that product received in the receptacle can leave the receptacle only through the open end. The device further includes a handle extending, a first end of which is coupled to the side wall so that a consumer of the product may rotate the handle from an initial position for packing the measuring device and the product into the package to a measuring position for measuring desired quantities of the product. When in the initial position, the handle extends from the side wall substantially parallel to the first direction and, when in the measuring position, the handle extends away from the side wall in a direction substantially perpendicular to the first direction.

12 Claims, 3 Drawing Sheets

FIG. 3
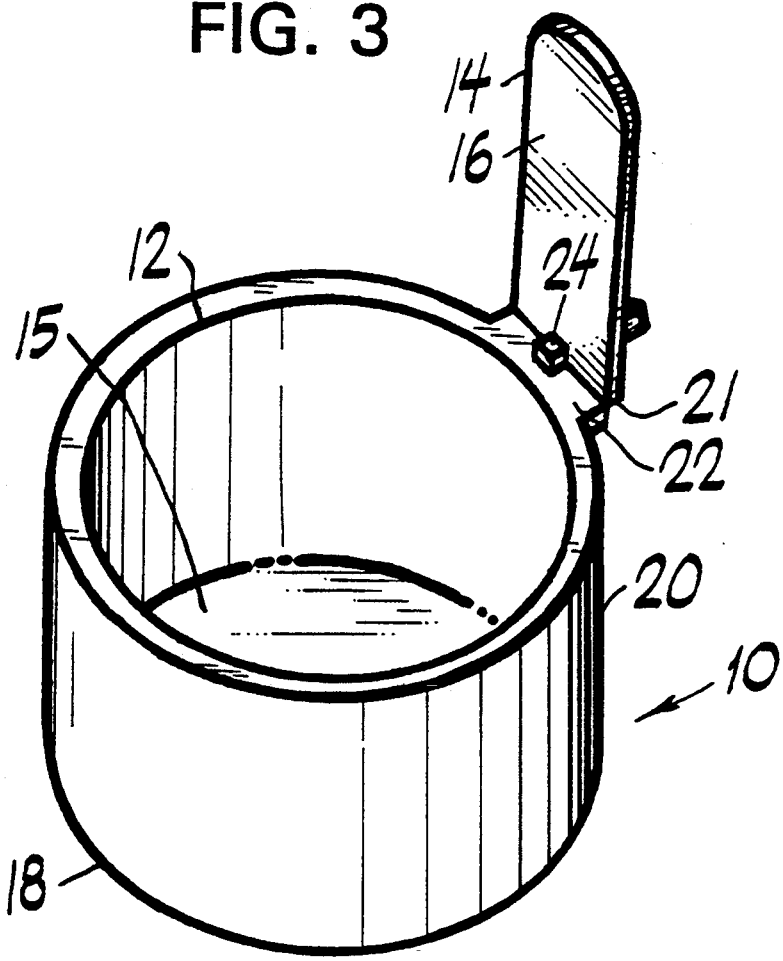
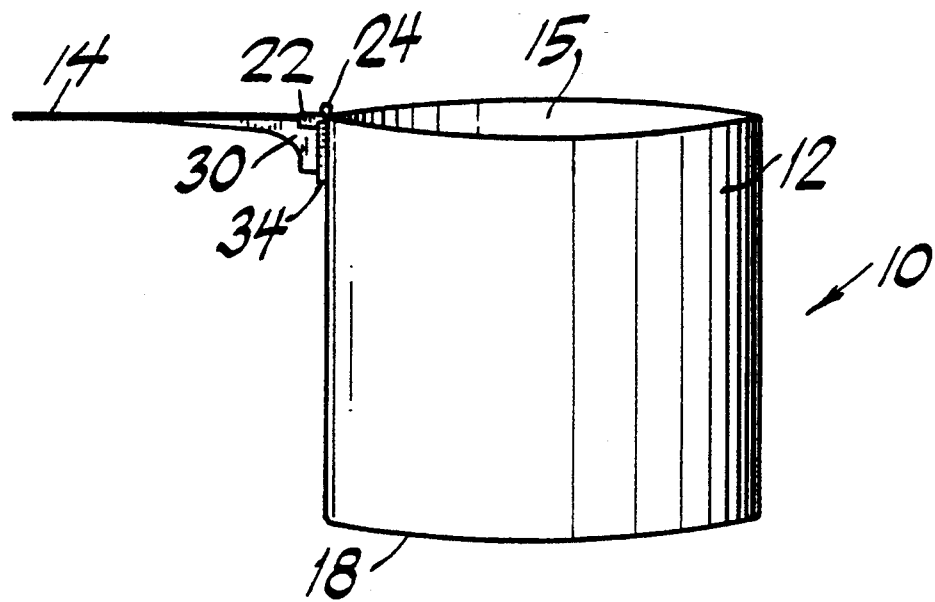
FIG. 4

MEASURING SCOOP

FIELD OF THE INVENTION

The present invention relates to measuring devices and is specifically related to scoops for measuring desired quantities of a powdered or granular product.

BACKGROUND OF THE INVENTION

Many powdered and granular substances such as coffee, tea, drink mixes and detergents are sold in packages which include a scoop which may be used to dispense measured quantities of the product. As shown in FIG. 1, a known scoop 10 usually consists of a pocket 12 of known volume and a handle 14 including a flat surface 16 oriented substantially parallel to the bottom surface 18 of the pocket 12 and projecting from a side of the pocket 12. The handle 14 and the pocket 12 are generally integrally formed of plastic.

The packaging of these powdered and granular materials is often mechanized with the scoop 10 being inserted into an inverted empty package with an open end 20 of the pocket 12 facing up toward the open bottom of the package. A measured quantity of the product is filled into the package and a bottom of the package is then attached. Thus, the product weighs down on the scoop 10 during insertion.

Alternatively, the product may first be filled into the package through an open top of the package. To reduce the required size of the package the scoop 10 may then be pressed into the product so that it does not project out of the product.

However, a problem often arises when the product is inserted into the package onto the scoop 10 or when the scoop is pressed into the product. Specifically, because the handle 14 projects out of the pocket 12, the entire flat surface 16 of the handle 14 is pressed upon by the product. The resulting torque causes many handles to break off. Thus, the speed at which the product is inserted into the package and/or the pressure which the product may exert on the scoop 10, must be reduced. This reduces the speed at which the packages of product may be produced and causes a number of scoops to fail before they reach the consumer.

Thus there is a need for a scoop which can withstand the pressure resulting from the insertion of a powdered or granular product rapidly and at increased pressure.

SUMMARY OF THE INVENTION

The present invention is directed to a device for measuring a powdered or granular product, wherein the device is included in a package with the product. The measuring device includes a product receptacle having an open end through which the product may be introduced into the receptacle, a side wall surrounding the open end and extending a predetermined distance away from the open end in a first direction and a sealing member disposed opposite the open end. The sealing member is coupled to the side wall so that product received in the receptacle can leave the receptacle only through the open end. The device further includes a handle extending from a first end to a second end, the first end being coupled to the side wall so that a consumer of the product may rotate the handle from an initial position for packing the measuring device and the product into the package to a measuring position for measuring desired quantities of the product. When in the initial position, the handle extends from the side wall substantially parallel to the first direction and, when in the measuring position, the handle extends away from the side wall in a direction substantially perpendicular to the first direction.

BRIEF DESCRIPTION OF THE DRAWINGS

FIG. 3 shows a second perspective view of the scoop according to the first embodiment of the present invention wherein the scoop is in the first position;

FIG. 4 shows a side view of the scoop according to the first embodiment of the present invention wherein the scoop is in a second position for measuring and/or dispensing product.

DETAILED DESCRIPTION

Figure 1:
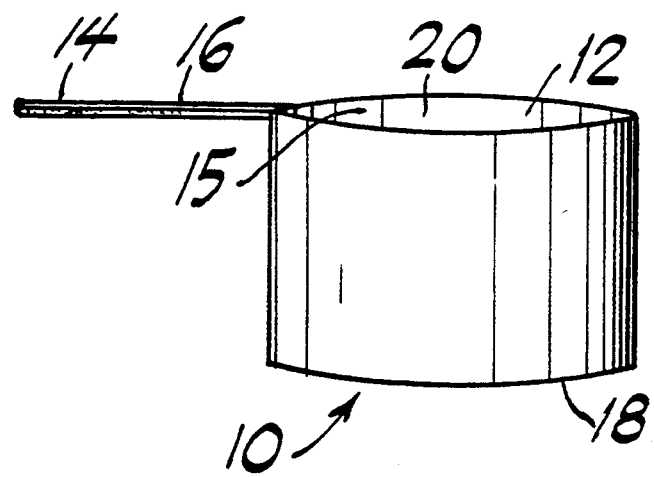
FIG. 1 shows a side view of a prior art scoop.
Figure 2:
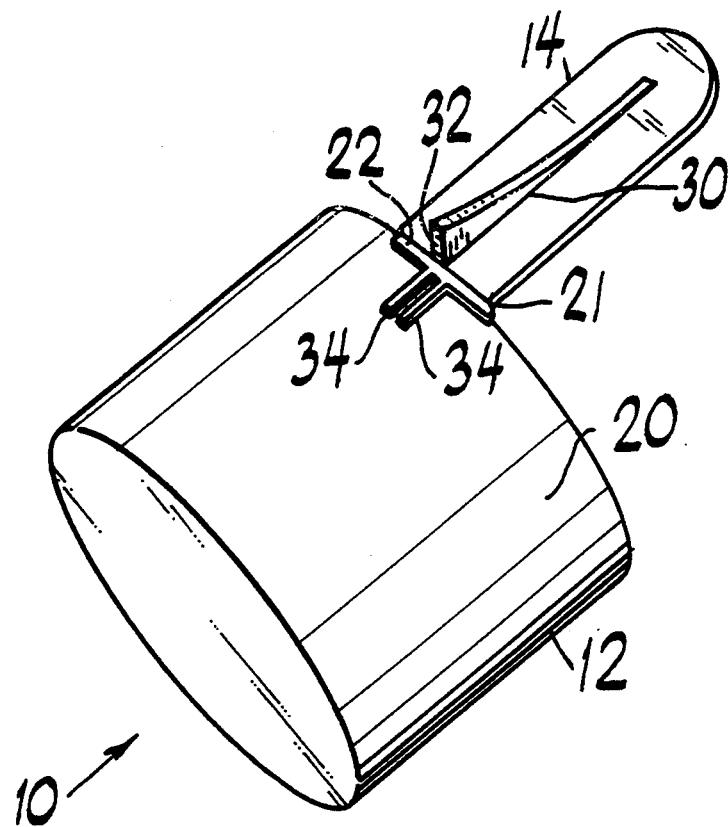
FIG. 2 shows a perspective view of a scoop according to a first embodiment of the present invention, wherein the scoop is in a first position for insertion into a package.

A scoop 10 according to a first embodiment of the present invention is shown in FIGS. 2-4. The scoop 10 includes a substance receiving pocket 12 and a handle 14 which is coupled to the pocket 12. The substance receiving pocket 12 includes an open upper end 15, a closed bottom surface 18 and a circular side wall 20. The circular sidewall 20 defines a central axis which is substantially perpendicular to the bottom surface 18. Although each of the embodiments of the present invention described herein includes a circular scoop, those skilled in the art will recognize that the shape of the scoop may be varied and that a scoop of any shape may be employed without departing from the teachings of the present invention.

As seen in FIGS. 2 and 3, in the first position for insertion into a package, the handle 14 is coupled by means of a hinge 21 to a projection 22 which extends from an upper portion of the side wall 20. The handle is coupled to the projection 22 by means of a breakable tab 24. The tab 24 maintains the handle in the first position so that it extends away from the upper end 15 in a direction which is substantially parallel to the central axis of the side wall 20. Thus, the handle 14 initially extends substantially parallel to the side wall 20. The flat surface 16 of the handle 14 provides a gripping surface. A stiffening spine 30 projects from the surface of the handle 14 which is opposite the surface 16. The width of the spine 30 gradually increases as it extends closer to the end of the handle 14 which is coupled to the projection 22. The spine 30 includes an end surface 32 which extends in a direction which is substantially perpendicular to the surface 16.

FIG. 4 shows the handle 14 in a second position for measuring and/or dispensing product from the package. In the second position, the breakable tab 24 has been separated from the handle 14 and the handle 14 has been rotated about the hinge 21 so that the flat gripping surface 16 extends in a direction substantially perpendicular to the central axis. In the second position, the surface 32 of the spine 30 contacts the side wall 20 and is received between two ridges 34. Those skilled in the art will recognize that the pocket 12 of the scoop 10 need not be circular and may be formed in any shape. In addition, those skilled in the art will recognize that the entire scoop will preferably be integrally formed of plastic.

In operation, the scoop 10 is inserted into an inverted package so that it rests on the top surface of the package with the open end of the pocket 12 facing upward toward the open bottom of the package. In this position, the handle 14 extends directly upward parallel to the side wall 20 of the scoop 10. A measured quantity of the powdered or granular product is then inserted through the open bottom of the package, covering the scoop 10. As the handle 14 projects directly into the product, little torque is exerted on the handle 14 and the possibility of the handle 14 breaking is reduced. A bottom is then attached to the package. When the package is opened, the consumer removes the scoop 10 from the product, rotates the handle 14 about the hinge 21, breaking the tab 24, until the surface 32 of the spine 30 is received between the ridges 34 and contacts the side wall 20 of the pocket 12. The scoop 10 is then in the second position for measuring and/or dispensing the product.

Similarly, the product may be inserted into an upright package with an open top. The scoop 10 may then be pressed into the product so that the handle 14 and the side wall 20 of the scoop 10 penetrate the product. When pressed into the product, the handle 14 extends directly downward, parallel to the side wall 20 of the scoop 10. As the handle 14 projects directly into the product, little torque is exerted on the handle 14 and the possibility of the handle 14 breaking is reduced.

Figure 5:
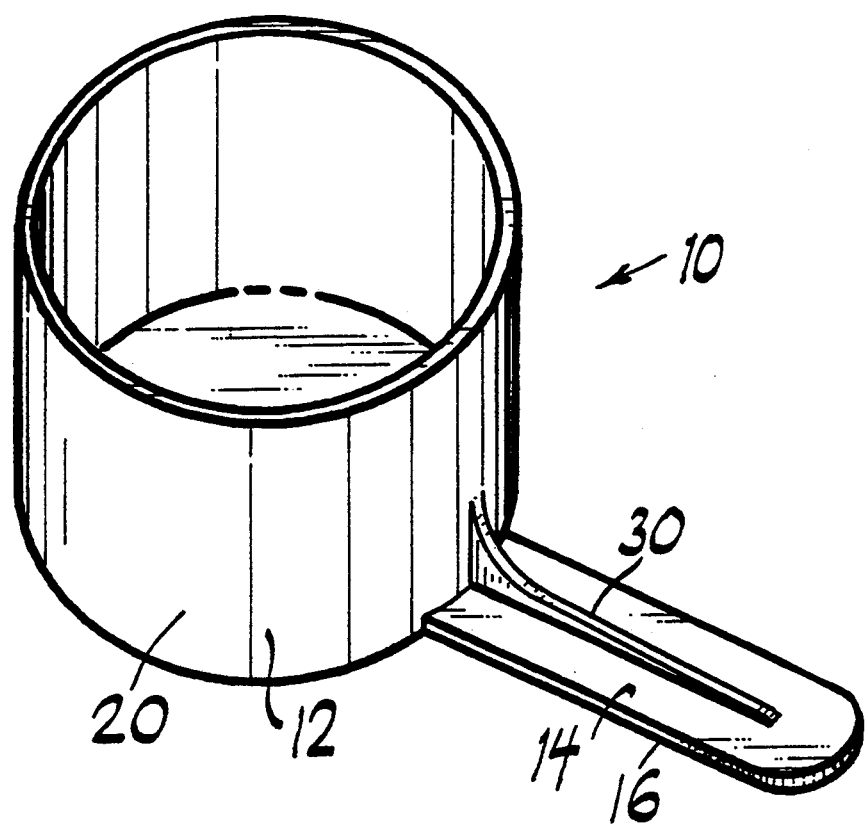
FIG. 5 shows a perspective view of a scoop according to a second embodiment of the present invention.

A scoop 10 according to a second embodiment of the present invention is shown in FIG. 5. The scoop 10 includes a handle 14 which is rigidly coupled to the pocket 12 at a bottom of the side wall 20. Thus, the handle 14 extends in a direction which is substantially perpendicular to the side wall 20. The flat gripping surface 16 of the handle 14 is located on a lower surface of the handle 14. A stiffening spine 30 projects from the surface of the handle 14 which is opposite the flat gripping surface 16. The width of the spine 30 gradually increases as it extends closer to the end of the handle 14 which is coupled to the side wall 20.

In operation, the scoop 10 according to the second embodiment of the present invention is inserted into an inverted package so that it rests on the top surface of the package with the open end of the pocket 12 facing upward toward the open bottom of the package. Thus, the flat gripping surface 16 of the handle 14 and the bottom surface 18 of the pocket 12 rest on the top of the package. A measured quantity of the powdered or granular product is then inserted through the open bottom of the package, covering the scoop 10. As the handle 14 is supported by the top surface of the package, the possibility of the handle 14 breaking is reduced. Similarly, the product may be inserted into an upright package with an open top. The scoop 10 may then be pressed into the product so that the handle 14 and the side wall 20 of the scoop 10 penetrate the product. When pressed into the product, the handle 14 does not come into contact with the product until the entire scoop 10 has penetrated the product to the extent that the bottom surface 18 of the pocket 12 contacts the product. Thus, little torque is generated about the point of contact between the handle 14 and side wall 20 and the possibility of the handle 14 breaking is reduced.

There are many modifications which will be apparent to those skilled in the art will. Those skilled in the art will recognize that the embodiments of the present invention described herein are illustrative and that the scope of the invention is intended to be limited only by the claims appended hereto.

What is claimed is:

1. A measuring device adapted to be included in a package containing a product, the measuring device comprising:
   a product receptacle including an open end through which the product may be introduced into the receptacle, a side wall surrounding the open end and extending a predetermined distance away from the open end in a first direction and a sealing member disposed opposite the open end and coupled to the side wall, wherein the side wall is coupled to the sealing member so that product received in the receptacle can leave the receptacle only through the open end;
   a substantially straight, rigid handle extending from a first end to a second end, the first end being rotatably coupled to the side wall via a hinge so that a consumer of the product may rotate the handle from an initial position, in which the handle is maintained as the measuring device and the product are packed into the package, to a measuring position for measuring desired quantities of the product, wherein, when in the initial position, the handle extends from the side wall substantially parallel to the first direction so that the second end of the handle is further from the sealing member than the first end of the handle is from the sealing member and, when in the measuring position, the handle extends away from the side wall in a direction substantially perpendicular to the first direction, wherein the handle includes an abutting surface for contacting the product receptacle to prevent the handle from rotating past the measuring position; and;
   means for maintaining the handle in the initial position during the packing of the measuring device and the product into the package.

2. A measuring device according to claim 1, wherein the entire measuring device is integrally formed.

3. A measuring device according to claim 2, wherein the measuring device is integrally formed of plastic.

4. A measuring device according to claim 1, wherein the means for maintaining comprises a tab coupled between the handle and the side wall, wherein, when a consumer of the product rotates the handle from the initial position into the measuring position, the tab is broken.

5. A measuring device according to claim 1, wherein the handle includes a substantially planar gripping surface and a spine projecting from a surface opposite the gripping surface, the spine extending from the first end of the handle to the second end of the handle.

6. A measuring device according to claim 1, wherein a projection extends from the side wall in direction substantially perpendicular to the first direction, wherein the hinge is coupled to an outer portion of the projection.

7. A measuring device according to claim 6, wherein the hinge is coupled between the projection and the first end of the handle.

8. A measuring device according to claim 7, wherein the handle includes a substantially planar gripping surface and a spine projecting from a surface of the handle opposite the gripping surface and extending from the first end of the handle toward the second end of the handle.

9. A measuring device according to claim 5, wherein the projection of the spine from the surface opposite the gripping surface gradually increases to a maximum projection at the first end of the handle, wherein the abutting surface is formed on a first end surface of the spine adjacent to the first end of the handle.

10. A measuring device according to claim 5 wherein the abutting surface is formed on a first end surface of the spine adjacent to the first end of the handle.

11. A measuring device according to claim 1, wherein the side wall is cylindrical and defines a central axis parallel to the first direction, wherein the sealing member is circular and lies in a plane which is substantially perpendicular to the central axis.

12. A measuring device according to claim 10, wherein two substantially parallel ridges are formed on the side wall forming a slot in which an end portion of the spine is received when the handle is in the measuring position so that the abutting surface contacts a portion of the side wall extending between the two ridges.

* * * * *